(12) United States Patent
Benassi et al.

(10) Patent No.: US 8,561,490 B2
(45) Date of Patent: *Oct. 22, 2013

(54) FARM VEHICLE POWER TAKE-OFF (75) Inventors: Giancarlo Benassi, Modena (IT); Ivan Tioli, Modena (IT)

(73) Assignee: CNH America LLC, New Holland, NH (US)

( * ) Notice: Subject to any disclaimer, the term of this patent is extended or adjusted under 35 U.S.C. 154(b) by 1207 days.

This patent is subject to a terminal disclaimer.

(21) Appl. No.: 12/102,009

(22) Filed: Apr. 13, 2008

(65) Prior Publication Data

US 2009/0145251 A1    Jun. 11, 2009

(30) Foreign Application Priority Data

Apr. 13, 2007   (IT) ................ TO2007A0259

(51) Int. Cl.
*B60K 17/28*   (2006.01)
*F16H 3/02*    (2006.01)
*F16H 37/06*   (2006.01)

(52) U.S. Cl.
CPC ...................... *B60K 17/28* (2013.01)
USPC ............. 74/15.6; 74/15.2; 74/15.4; 74/15.84; 74/15.66; 74/473.37; 74/392; 74/606 R (58) Field of Classification Search
USPC ............... 74/15.2–15.88, 473.36, 473.37, 11, 74/606 R
See application file for complete search history.

(56) References Cited

U.S. PATENT DOCUMENTS

| | | | | |
|---|---|---|---|---|
| 3,830,111 A | * | 8/1974 | Travaglio | 74/15.4 |
| 4,000,662 A | * | 1/1977 | Wolfe | 74/331 |
| 4,141,424 A | * | 2/1979 | Murayama et al. | 180/53.2 |
| 4,938,085 A | * | 7/1990 | Suzuki et al. | 74/15.2 |
| 5,058,455 A | * | 10/1991 | Nemoto et al. | 74/606 R |
| 5,511,436 A | * | 4/1996 | Hasegawa et al. | 74/331 |
| 6,523,429 B2 | * | 2/2003 | Desmarchelier et al. | 74/373 |
| 7,377,342 B2 | * | 5/2008 | Miyazaki et al. | 180/62 |
| 8,161,833 B2 | * | 4/2012 | Benassi et al. | 74/15.2 |
| 2002/0043121 A1 | * | 4/2002 | Desmarchelier et al. | 74/373 |
| 2008/0250885 A1 | * | 10/2008 | Benassi et al. | 74/15.2 |

FOREIGN PATENT DOCUMENTS

EP           1495 899 A1 *   1/2005   ............ B60K 17/10

* cited by examiner

*Primary Examiner* — Vinh Luong
(74) *Attorney, Agent, or Firm* — Sue. C. Watson (57) ABSTRACT A farm vehicle power take-off device, in particular for a tractor, wherein an output shaft is connected selectively by a drive to a first and second input shaft rotating at different speeds. The selective connection is made by moving a selector sleeve between three settings, in a first and second of which, the output shaft is connected to the first shaft to rotate at a first and second angular speed respectively, and, in a third of which, the output shaft is connected to the second shaft to rotate at a third angular speed different from the first and second angular speed.

12 Claims, 8 Drawing Sheets

FARM VEHICLE POWER TAKE-OFF

FIELD OF THE INVENTION

The present invention relates to a farm vehicle power take-off device, in particular for a tractor.

BACKGROUND OF THE INVENTION

In typical power take-off devices the first shaft is an engine shaft, and the second shaft a shaft of the vehicle transmission, so that, when the output shaft is connected angularly by the drive to the second shaft, the is angular speed, corresponding to the third speed, at the power take-off end is proportional to the angular speed of the shaft transmitting power to the vehicle wheels. For this reason, the third speed is commonly referred to as "ground speed", and is advantageously used for transmitting power to the wheels of a trailer.

In a power take-off device of the above type, selection is made, as described, for example, in US 2002/0043121, by means of two sleeves: a first sleeve is coaxial with the first shaft, and is movable axially between two work settings corresponding to the first and second speed respectively, and an intermediate idle setting corresponding to a neutral position of the output shaft; and a second sleeve is coaxial with the second shaft, and is movable axially between a work setting corresponding to the third speed, and an idle setting corresponding to a further neutral position of the output shaft.

Each sleeve can only be set to the/a respective work setting when the other sleeve is idle, and both are user-operated by respective control levers located in the vehicle cab and connected to the respective sleeves by respective drives.

Though effective and widely used, the above device has several drawbacks in production and operation relating to the mechanical complexity of the device.

SUMMARY OF THE INVENTION

The present invention relates to a power take-off device of the type comprising an output shaft having a power take-off end connectable to a machine or trailer; and a drive interposed between the output shaft and a first and second input shaft rotating at different angular speeds; the drive comprising selection means for selectively connecting the output shaft to the first and second shaft, and being so designed that the output shaft, when connected to the first shaft, rotates at a first or second angular speed, in particular 750 (or 1000) rpm and 540 rpm, and, when connected to the second shaft, rotates at a third angular speed different from the first and second speed.

It is an object of the invention to provide a power take-off device, which is cheap and easy to produce and, at the same time, easy to operate.

BRIEF DESCRIPTION OF THE DRAWINGS

The invention will now be described further, by way of example, with reference to the accompanying drawings, in which.

DESCRIPTION OF THE PREFERRED EMBODIMENT

Figure 1:
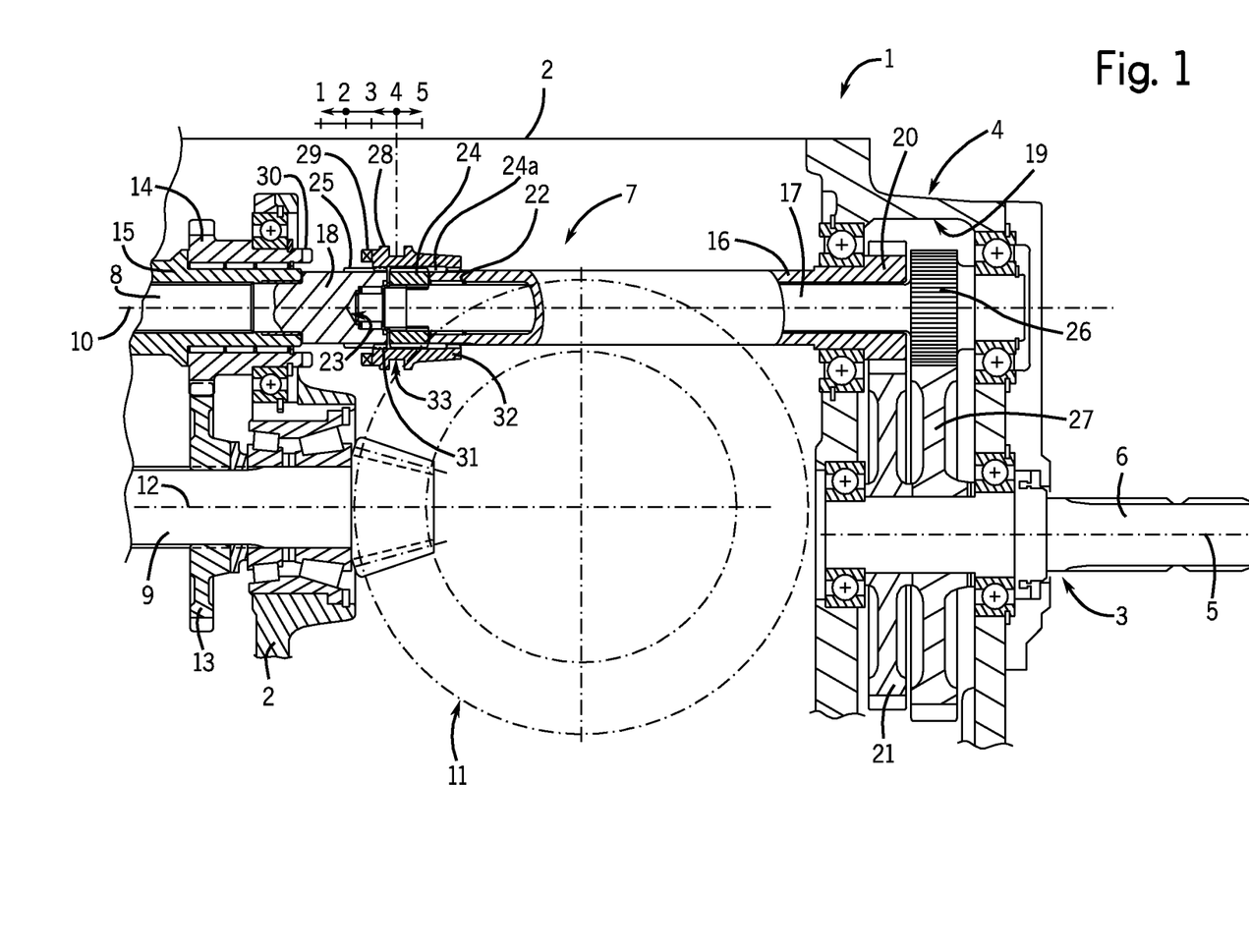
FIG. 1 shows a partial sectional view of a preferred embodiment of the power take-off device, with parts removed for clarity, according to the present invention.

FIG. 1 shows the power take-off device 1 for a farm vehicle of the present invention is fitted to a is frame 2 of the vehicle, and comprises an output shaft 3, which is fitted through a lateral wall 4 of frame 2 to rotate about an axis 5, and has a grooved free end projecting outwards and defining a power take-off end 6 connectable angularly (in known manner) to a drive member (not shown), normally a universal joint, to transmit power from output shaft 3 to a machine or trailer (not shown).

Upstream from output shaft 3, device 1 comprises a drive 7 interposed between output shaft 3 and first and second input shafts 8 and 9. The first input shaft 8 is an output shaft of the engine (not shown) and rotates about an axis 10 parallel to axis 5. The second input shaft 9 is an output shaft of the vehicle transmission 11, and rotates about an axis 12 parallel to axes 5 and 10.

More specifically, as shown in FIG. 1, the second input shaft 9 is supported for rotation by frame 2, and is fitted on its free end with a bevel pinion meshing with an output gear of transmission 11. Close to the pinion, The second input shaft 9 is fitted with a gear 13 meshing with a gear 14 which, together with gear 13, forms part of drive 7, is supported for rotation by frame 2, and is fitted in rotary manner, by means of rollers, to a hollow body 15 which is fixed with respect to frame 2, is coaxial with axis 10, and houses shaft 8 in rotary manner.

Drive 7 also comprises two shafts 16 and 17 coaxial is with each other and with axis 10, and extending from an end portion 18 of shaft 8 projecting axially from hollow body 15, to lateral wall 4, which is a hollow wall defined by an outer wall and an inner wall parallel to each other, perpendicular to axis 5, and spaced apart to form a cavity 19 in between.

Shaft 16 is hollow and is of substantially the same diameter as end portion 18 of shaft 8, and is fitted in rotary manner through the inner wall of lateral wall 4, and is fitted rigidly, on its free end inside cavity 19, with a gear 20 (first gear) meshing with a gear 21 (second gear) fitted to output shaft 3.

As shown in FIG. 1-9, at the opposite end to that supporting gear 20, shaft 16 has external teeth 22 coaxial with axis 10 and with a pitch diameter equal to the diameter of shaft 16.

Shaft 17 is mounted for rotation inside shaft 16, and, at the end facing shaft 8, has an end portion projecting axially from shaft 16 and inserted in a rotary manner inside a cavity 23 formed axially in the end portion 18 of shaft 8.

Shaft 17 is fitted with a toothed ring 24 coaxial with axis 10 in the gap between end portion 18 and shaft 16, and which has external teeth 24a with the same pitch and pitch diameter as teeth 22 and further teeth 25 on end portion 18 facing teeth 24a.

At the opposite end to that fitted with toothed ring 24, an end portion of shaft 17 projects axially from shaft 16, is fitted in rotary manner, by means of a bearing, through the outer wall of lateral wall 4, and is fitted, inside cavity 19, with a gear 26 (third gear) meshing with a gear 27 (fourth gear) fitted to output shaft 3.

As explained below, shafts 16 and 17 are connectable angularly and selectively to shafts 8 and 9 to connect output shaft 3 angularly to shaft 8 or 9 and accordingly rotate end 6 at different speeds.

Shafts 16 and 17 are connected angularly to shafts 8 and 9 by means of a selector defined by a sleeve 28, which is coaxial with axis 10, is fitted at least partly on end portion 18, and is movable axially between five settings: three work settings corresponding to respective angular speeds of end 6; and two intermediate idle settings between the three work settings and corresponding to respective neutral positions of end 6.

As shown in FIGS. 2-6, face teeth 29 are formed on the annular end surface of sleeve 28 facing gear 14, and mesh with like face teeth 30 formed on the annular end surface of gear 14 facing sleeve 28.

In addition to face teeth 29, sleeve 28 also has internal teeth 31 close to face teeth 29, coaxial with axis 10, and meshing with teeth 25 on end portion 18; sleeve 28 also has internal teeth 32 formed on the opposite axial end of sleeve 28 to teeth 31, and which are similar to teeth 31, and mesh selectively with teeth 24a of shaft 17 and teeth 22 of shaft 16.

An annular groove 33 in the outer lateral surface of sleeve 28 is engaged, in use, by a known fork (not shown), which is connected by a drive (not shown) to a control lever (not shown) in the vehicle cab to move sleeve 28 between the five selection settings when the control lever is operated by the user.

Operation of device 1 will now be described, as of the FIGS. 2 and 7 work setting, in which end 6 is rotated by shaft 9, via drive 7, at a first angular speed V1, the first speed setting, which is proportional to the speed of shaft 9, and therefore to the angular speed of the vehicle wheels, and therefore known as "ground speed".

In this setting, sleeve 28 is positioned so that face teeth 29 mesh with face teeth 30 of gear 14, and teeth 32 mesh with teeth 24a of shaft 17.

Accordingly, rotation is transmitted from shaft 9 to shaft 17 by gears 13 and 14 and sleeve 28, and from shaft 17 to output shaft 3, i.e. end 6, by gears 26 and 27.

The ratio between angular speed V1 and the angular speed of shaft 9 therefore equals gear ratio:

$$T_1 = (R_{13}/R_{14}) \times (R_{26}/R_{27})$$

i.e. the ratio between the radii of gears 13 and 14 times the ratio between the radii of gears 26 and 27.

Figure 2:
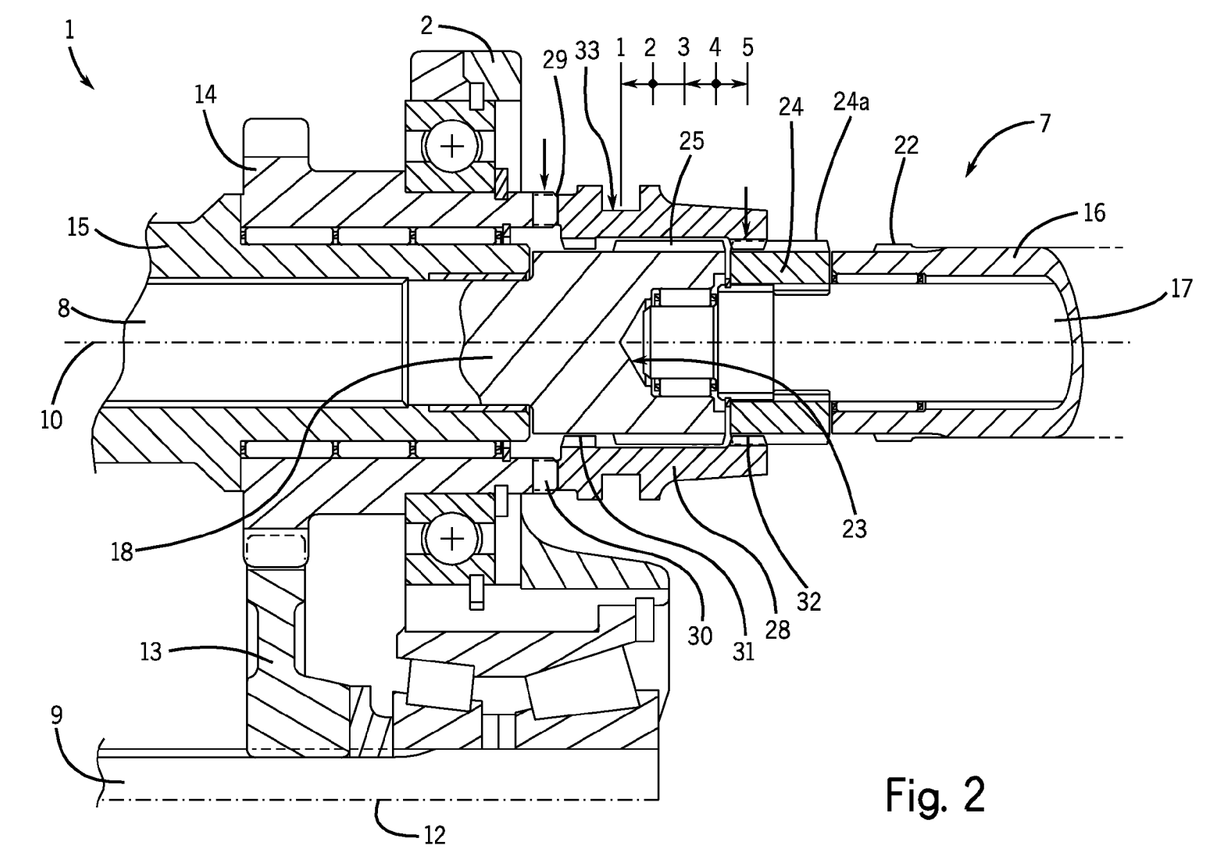
FIG. 2 shows a detail view of the power take-off is device of FIG. 1, in a first operating positions.
Figure 3:
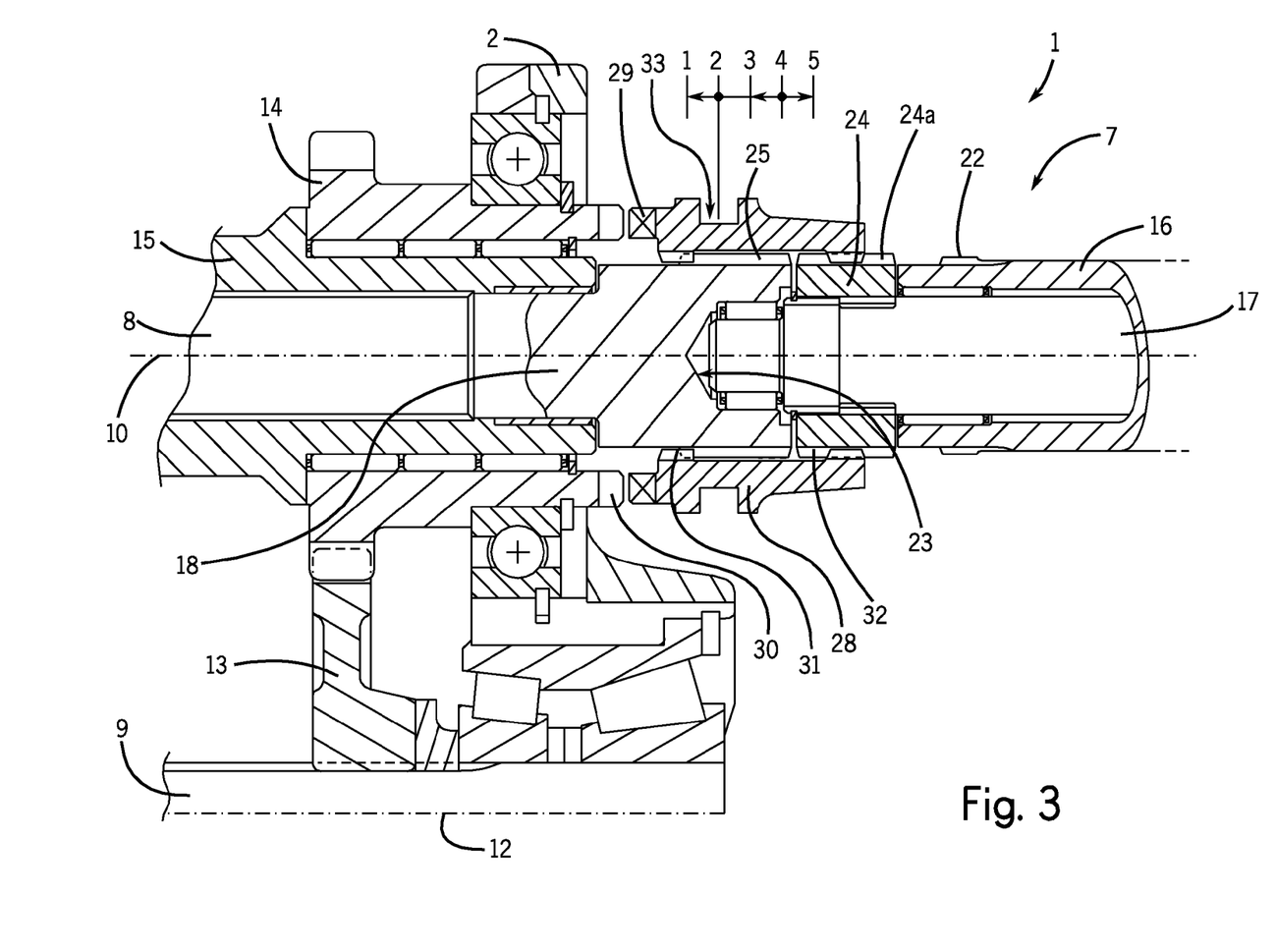
FIG. 3 shows a detail view of the power take-off device of FIG. 1, in a selection position correspondingly to an idle position of the stubs.
Figure 7:
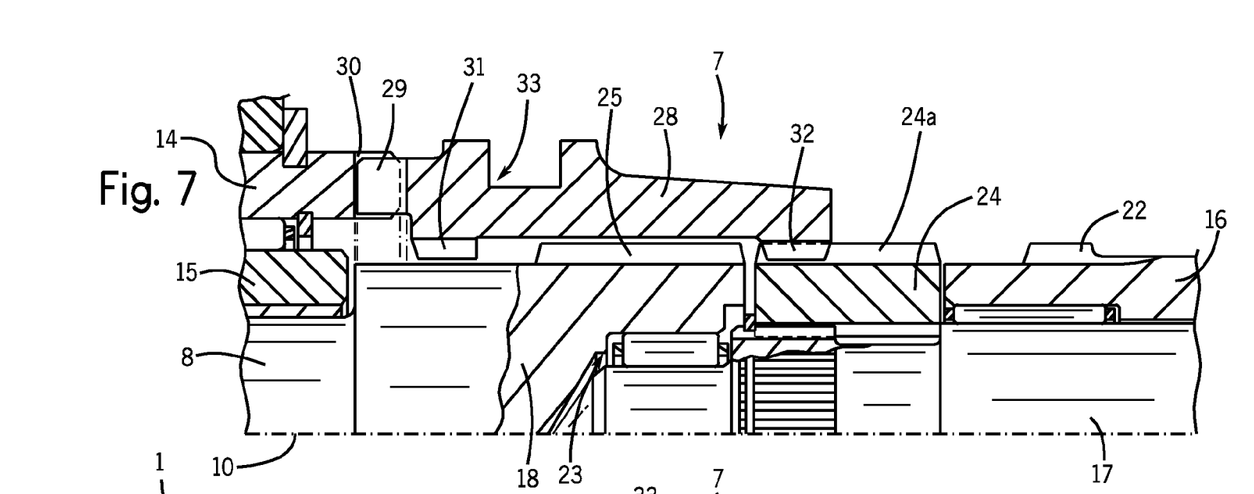
FIG. 7 shows a detail view of the power take-off device of FIG. 2, with the sleeve in a first operating position.

FIG. 3 shows the next setting after the FIGS. 2 and 7 setting and corresponding to a first neutral position of end 6. In this setting, which is achieved by moving sleeve 28 axially rightwards from the previous setting, teeth 32 still mesh with teeth 24a of shaft 17, but, since face teeth 29 no longer mesh with face teeth 30, and teeth 31 no longer mesh with teeth 25 of shaft 8, sleeve 28 receives no motion from either shaft 9 or shaft 8, and so transmits no rotation to shaft 17.

Figure 4:
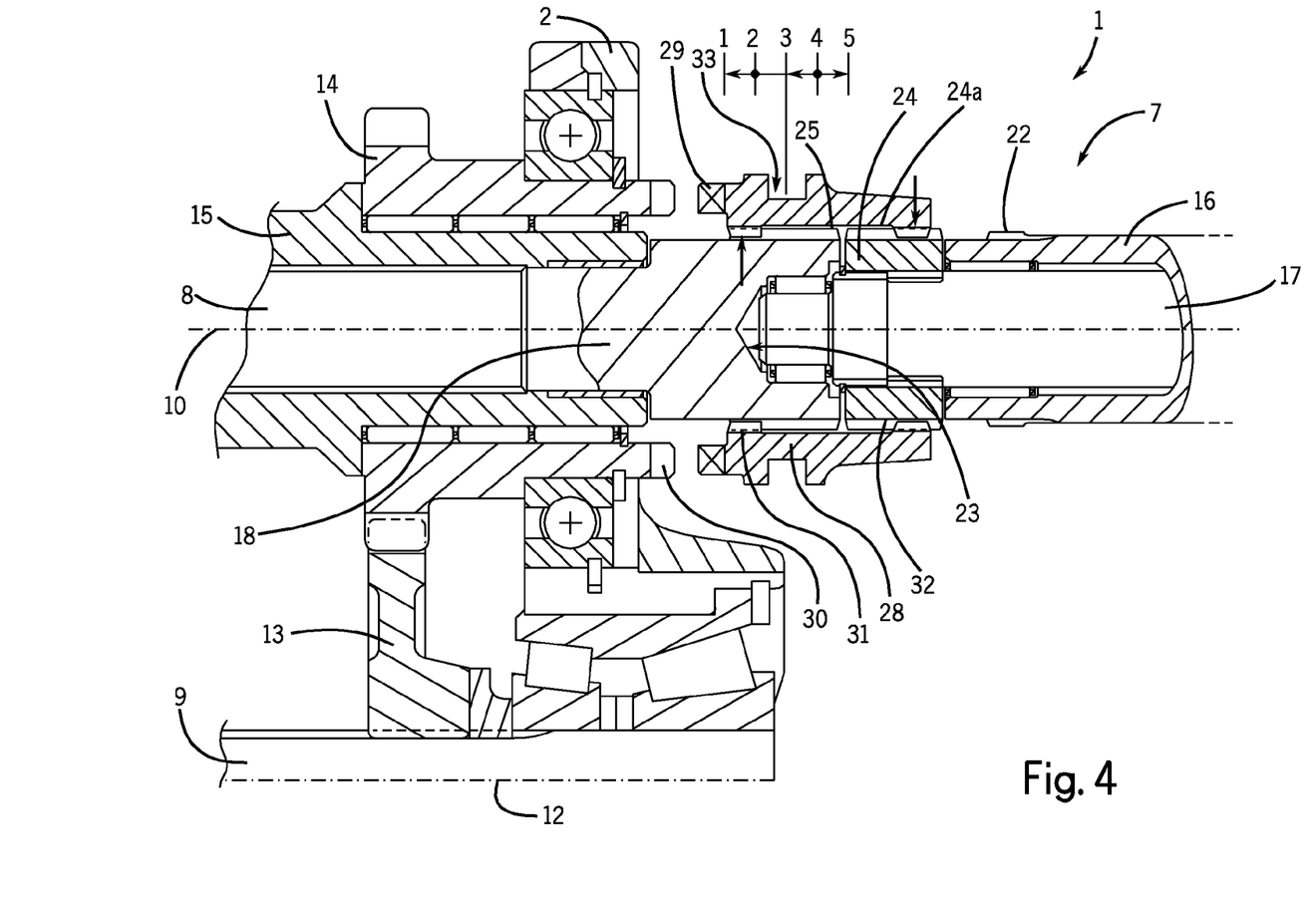
FIG. 4 shows a detail view of the power take-off device of FIG. 1, with the sleeve in a second operating position.
Figure 8:
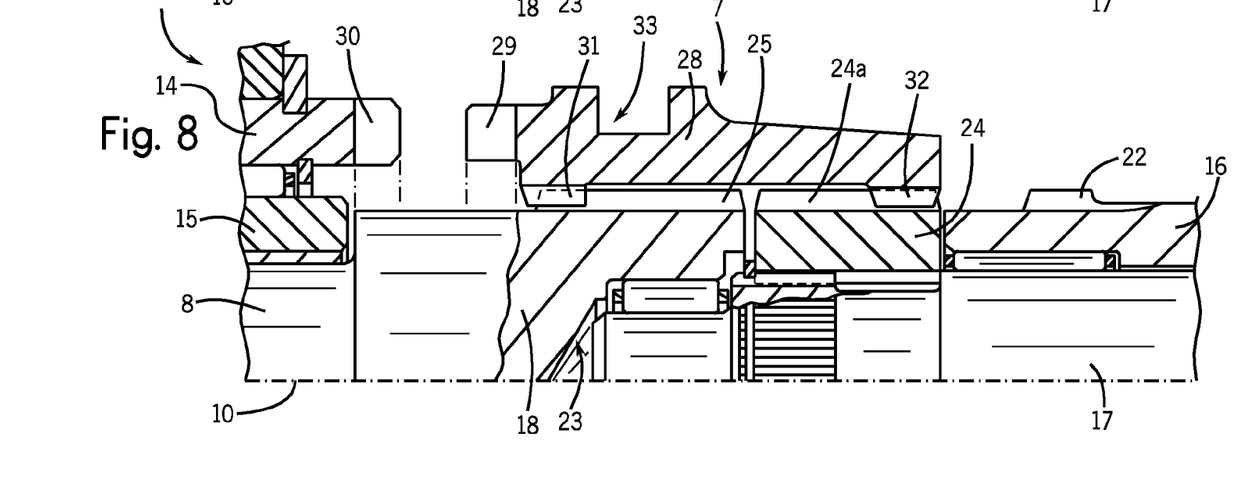
FIG. 8 shows a detail view of the power take-off device of FIG. 4, with the sleeve in a second operating position.

Further rightward movement of sleeve 28 moves it into the FIGS. 4 and 8 setting, a second speed setting at a second angular speed, in which output shaft 3 is connected angularly to shaft 8 by shaft 17, and end 6 rotates at a speed V2 of normally about 540 rpm.

In this setting, teeth 31 of sleeve 28 mesh with teeth 25 of shaft 8, and teeth 32 mesh with teeth 24a of shaft 17, so that motion is transmitted from shaft 8 to shaft 17 by sleeve 28, and from shaft 17 to output shaft 3 by gears 26 and 27.

The ratio between angular speed V2 and the angular speed of shaft 8 therefore equals gear ratio:

$$T_2 = R_{26}/R_{27}$$

i.e. the ratio between the radii of gears 26 and 27.

Figure 5:
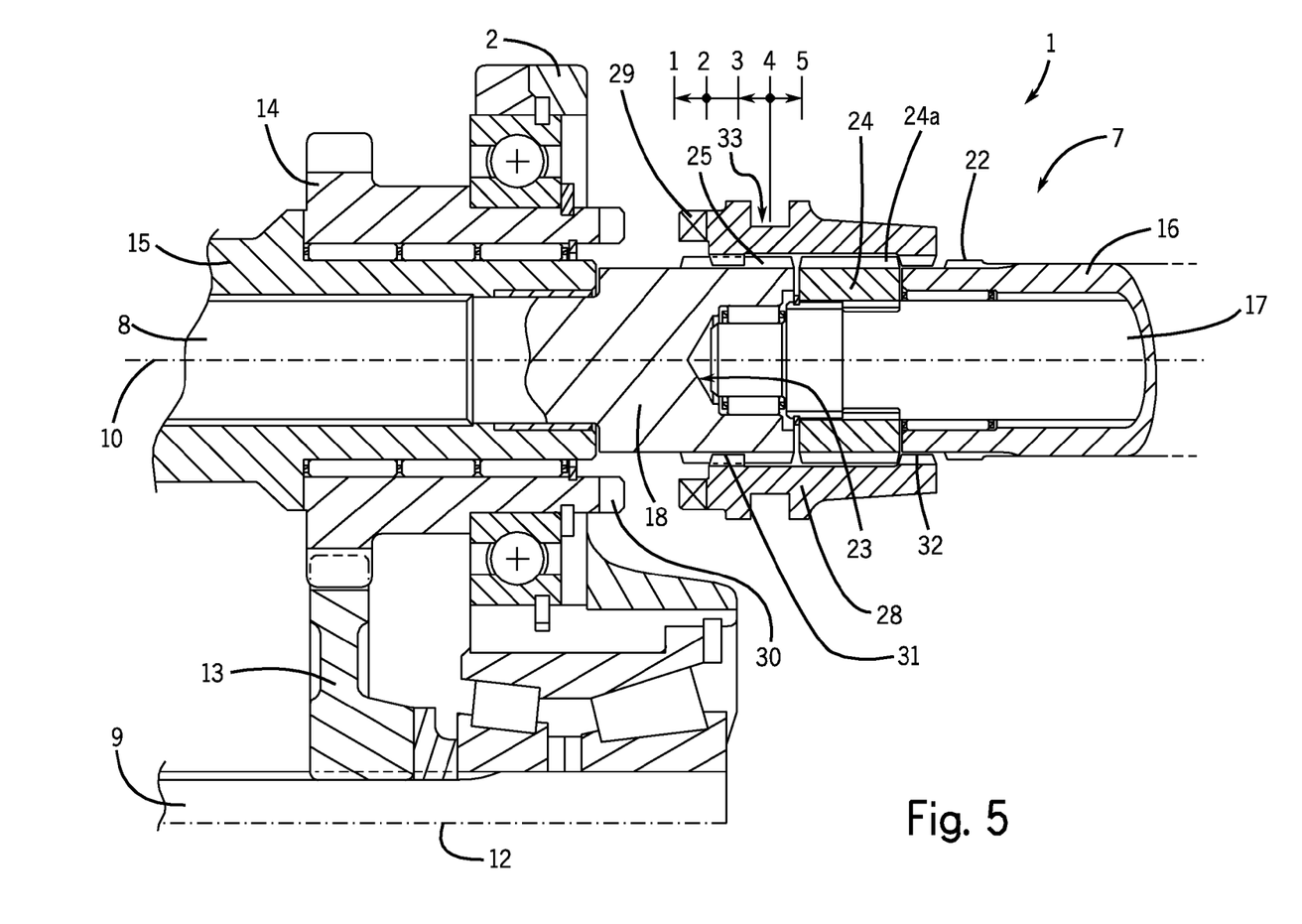
FIG. 5 shows a detail view of the power take-off device of FIG. 1, with the sleeve in a second selection position.

The next setting is shown in FIG. 5, and corresponds to a further second neutral position of end 6.

In this setting, which is achieved by further rightward axial movement of sleeve 28, teeth 31 still mesh with teeth 25 of shaft 8, but teeth 32 mesh with neither teeth 24a nor teeth 22, so that, despite sleeve 28 rotating at the angular speed of shaft 8, rotation of sleeve 28 is transmitted to neither shaft 17 nor shaft 16.

Figure 6:
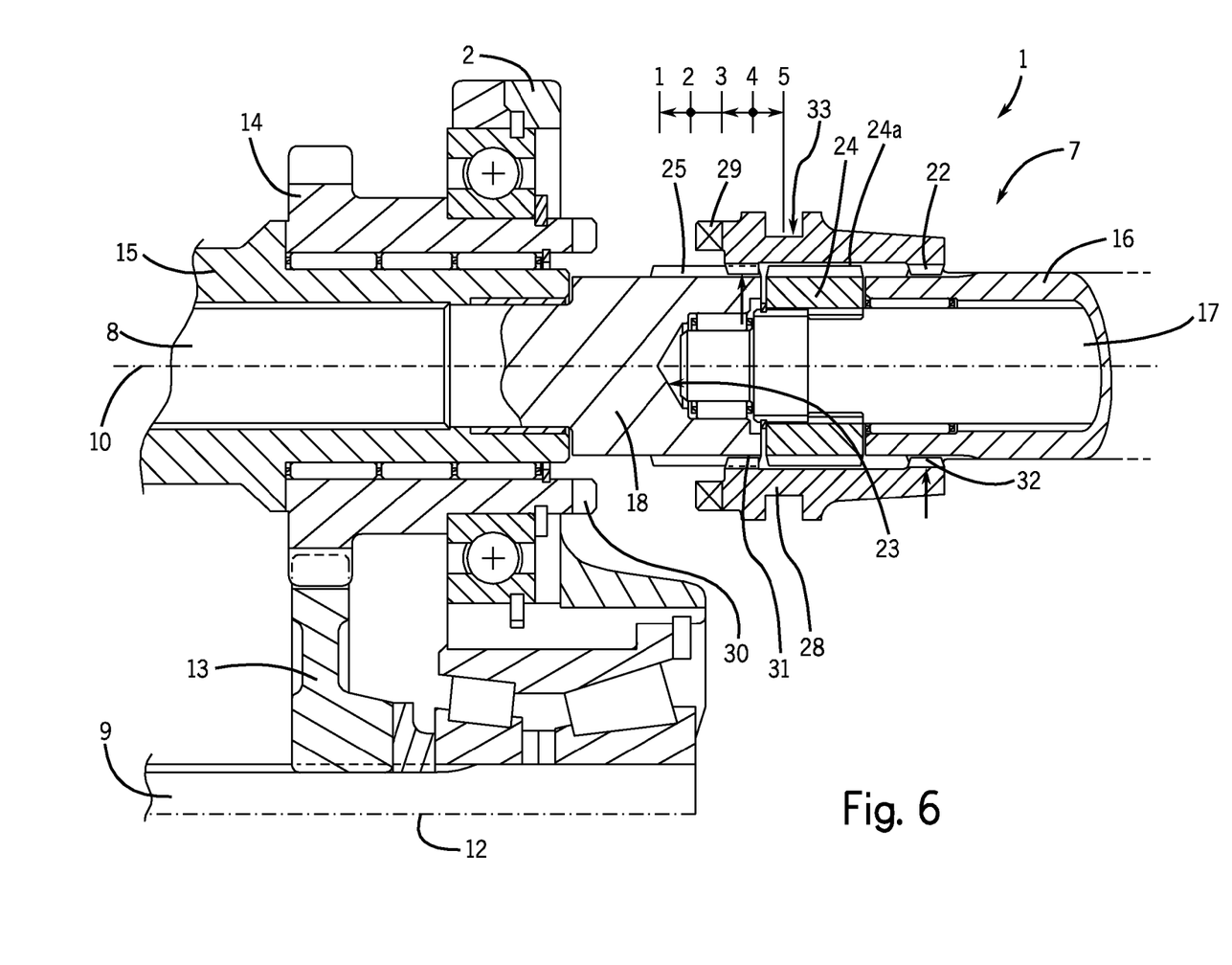
FIG. 6 shows a detail view of the power take-off device of FIG. 1, with the sleeve in a third operating position.
Figure 9:
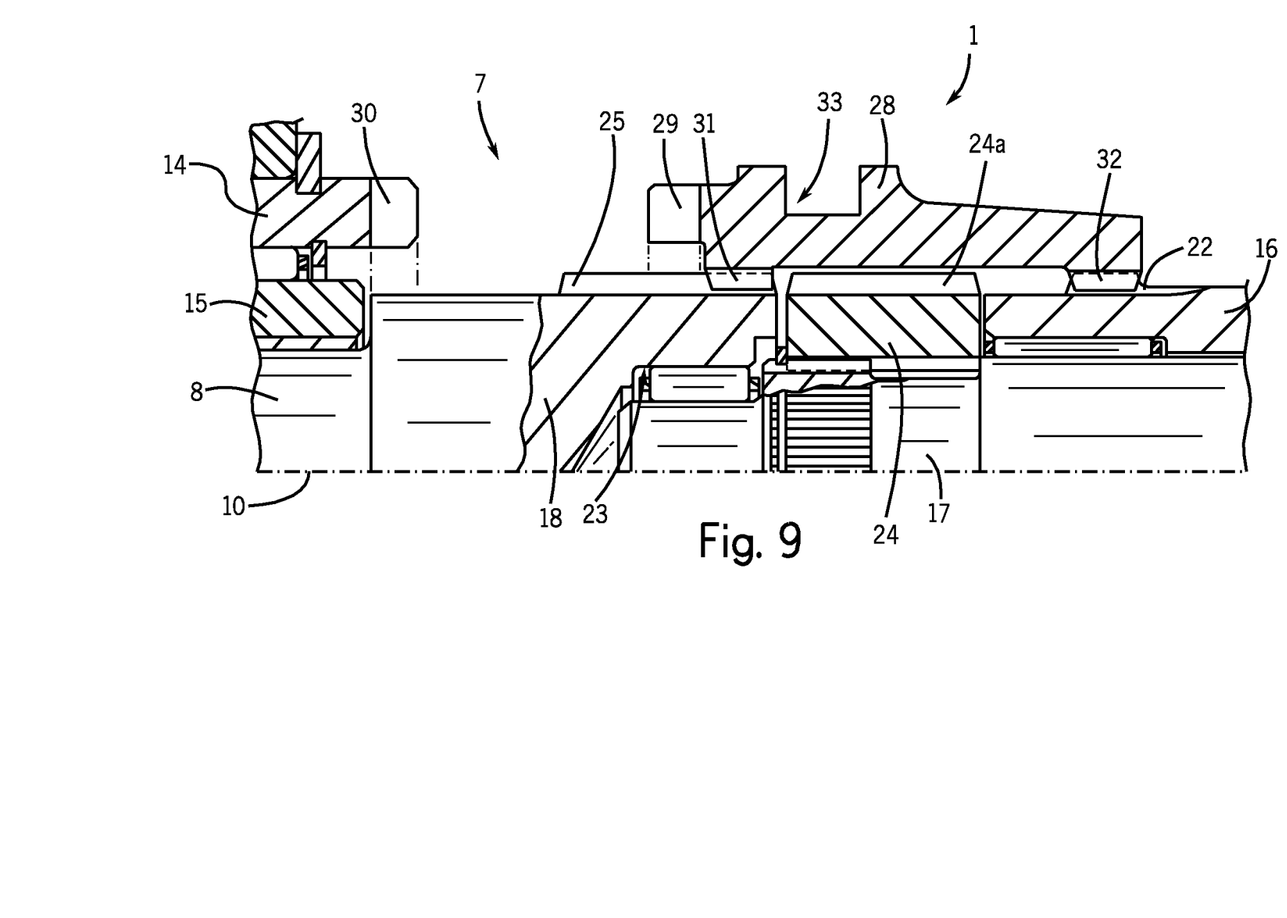
FIG. 9 shows a detail view of the power take-off device of FIG. 6, with the sleeve in a third operating position.

As shown in FIGS. 6 and 9, further rightward movement of sleeve 28 moves it into a further setting, a third setting at a third angular speed, in which output shaft 3 is connected angularly to shaft 8 by shaft 16, and end 6 rotates at a speed V3 of normally about 750 or 1000 rpm.

In this setting, teeth 31 of sleeve 28 mesh with teeth 25 of shaft 8, and teeth 32 mesh with teeth 22 of shaft 16, so that motion is transmitted by sleeve 28 from shaft 8 to shaft 16, and from shaft 16 to output shaft 3 by gears 20 and 21.

The ratio between angular speed V3 and the angular speed of shaft 8 therefore equals gear ratio:

$$T_3 = R_{20}/R_{21}$$

i.e. the ratio between the radii of gears 20 and 21.

The device 1 provides for selecting three different angular speeds of end 6, i.e. 540 rpm (second speed setting at second angular speed), 750 or 1000 rpm third speed setting at third angular speed), and so-called "ground speed" (first speed setting at first angular speed), using only one selector defined by sleeve 28. And since one sleeve also means one actuating fork and one control lever, this greatly simplifies operator control design and operation.

Moreover, by transmitting motion using coaxial shafts 16 and 17, sleeve 28 can be distanced from output shaft 3 and located in a more central position on the vehicle, closer to the operator cab, thus advantageously reducing and simplifying the drive between sleeve 28 and the control lever in the cab, with obvious advantages in terms of reliability and manufacturing cost.

What is claimed is:

1. A power take-off device for a tractor, the device comprising:
   an output shaft including a power take-off shaft;
   a drive interposed between the output shaft and a first input shaft and a second input shaft rotating at different angular speeds;
   the drive comprising a selector for connecting the output shaft selectively to the first input shaft and the second input shaft, such that the output shaft when connected to the first input shaft rotates at a first angular speed or a second angular speed, and, when the output shaft is connected to the second input shaft, rotates at a third angular speed which is different from the first angular speed and the second angular speed; and
   wherein the selector is configured to move between at least three speed settings and two neutral positions, corresponding from left to right, to the first angular speed of a first speed setting, a first neutral position, the second angular speed of a second speed setting, a second neutral position, and the third angular speed of a third speed setting of the output shaft, respectively,
   wherein the drive comprises a hollow shaft and an inner shaft rotating freely inside the hollow shaft, wherein the hollow shaft and inner shaft are coaxial with each other and with the first input shaft, and
   wherein the hollow shaft has external teeth at one end facing the first input shaft, and the hollow shaft is fitted at the opposite end with a first gear meshing with a second gear fitted to the output shaft.

2. A device as claimed in claim 1, wherein the inner shaft has external teeth, identical to the teeth of the hollow shaft, at an end projecting axially from the hollow shaft towards the first input shaft, and the inner shaft at the opposite end is fitted with a third gear meshing with a fourth gear fitted to the output shaft.

3. A device as claimed in claim 2, wherein the first input shaft has external teeth on an end portion facing the hollow shaft and the inner shaft.

4. A device as claimed in claim 3, wherein the sleeve has first internal teeth and second internal teeth spaced apart such that in the first speed setting, the first internal teeth mesh with the teeth of the first input shaft, and the second internal teeth mesh with the teeth of the hollow shaft, and in the second speed setting, the first internal teeth mesh with the teeth of the first input shaft, and the second internal teeth mesh with the teeth of the inner shaft.

5. A device as claimed in claim 1, wherein the selector is a sleeve, and wherein the sleeve is coaxial with the first input shaft, and is movable axially between a first setting, in which the sleeve connects the first input shaft angularly to the hollow shaft; a second setting, in which the sleeve connects the first input shaft angularly to the inner shaft; and a third setting, in which the sleeve connects the second input shaft angularly to the inner shaft.

6. A power take-off device for a tractor, the device comprising:
   an output shaft including a power take-off shaft;
   a drive interposed between the output shaft and a first input shaft and a second input shaft rotating at different angular speeds;
   the drive comprising a selector for connecting the output shaft selectively to the first input shaft and the second input shaft, such that the output shaft when connected to the first input shaft rotates at a first angular speed or a second angular speed, and, when the output shaft is connected to the second input shaft, rotates at a third angular speed which is different from the first angular speed and the second angular speed; and
   wherein the selector includes a sleeve, and the selector is configured to move between at least three speed settings corresponding to the first angular speed of a first speed setting, the second angular speed of a second speed setting, and the third angular speed of a third speed setting of the output shaft, respectively, and
   wherein when the selector is positioned in a first speed setting, the output shaft is operably connected to the second input shaft, when the selector is positioned in a second speed setting, the output shaft is operably connected to the first input shaft, and when the selector is positioned in the third position, the output shaft is operably connected to the first input shaft.

7. A device as claimed in claim 6, wherein the drive comprises a hollow shaft and an inner shaft rotating freely inside the hollow shaft, wherein the hollow shaft and inner shaft are coaxial with each other and with the first input shaft, and wherein the hollow shaft has external teeth at one end facing the first input shaft, and the hollow shaft is fitted at the opposite end with a first gear meshing with a second gear fitted to the output shaft.

8. A device as claimed in claim 7, wherein the inner shaft has external teeth, identical to the teeth of the hollow shaft, at an end projecting axially from the hollow shaft towards the first input shaft, and the inner shaft at the opposite end is fitted with a third gear meshing with a fourth gear fitted to the output shaft, and wherein the first input shaft has external teeth on an end portion facing the hollow shaft and the inner shaft.

9. A device as claimed in claim 6, wherein the sleeve is coaxial with the first input shaft, and the sleeve is movable axially between a first speed setting, in which the sleeve connects the first input shaft angularly to the hollow shaft; a second speed setting, in which the sleeve connects the first input shaft angularly to the inner shaft; and a third speed setting, in which the sleeve connects the second input shaft angularly to the inner shaft.

10. A device as claimed in claim 9, wherein the sleeve has first internal teeth and second internal teeth spaced apart such that in the first speed setting, the first internal teeth mesh with the teeth of the first input shaft, and the second internal teeth mesh with the teeth of the hollow shaft, and in the second speed setting, the first internal teeth mesh with the teeth of the first input shaft, and the second internal teeth mesh with the teeth of the inner shaft.

11. A device as claimed in claim 6, wherein the first input shaft is an output shaft of an engine of the tractor, and the second input shaft is an output shaft of a transmission of the tractor.

12. A device as claimed in claim 6, wherein the first angular speed is about 540 rpm and the second angular speed is about 750 rpm.

* * * * *